United States Patent
Lohr et al.

(10) Patent No.: US 7,860,052 B2
(45) Date of Patent: Dec. 28, 2010

(54) HAPPY BIT SETTING IN A MOBILE COMMUNICATION SYSTEM

(75) Inventors: Joachim Lohr, Langen (DE); Hitoshi Iochi, Osaka (JP); Dragan Petrovic, Langen (DE)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 10/589,859

(22) PCT Filed: Mar. 31, 2006

(86) PCT No.: PCT/EP2006/002971

§ 371 (c)(1),
(2), (4) Date: Aug. 16, 2007

(87) PCT Pub. No.: WO2006/103099

PCT Pub. Date: Oct. 5, 2006

(65) Prior Publication Data

US 2007/0297360 A1   Dec. 27, 2007

(30) Foreign Application Priority Data

Apr. 1, 2005   (EP) ................................ 05007192

(51) Int. Cl.
H04W 4/00   (2009.01)
(52) U.S. Cl. .................... 370/329; 370/335; 370/342; 370/230
(58) Field of Classification Search ............ 370/329
See application file for complete search history.

(56) References Cited

U.S. PATENT DOCUMENTS

| | | | | |
|---|---|---|---|---|
| 6,970,427 | B2 * | 11/2005 | Ranta-Aho et al. | 370/236 |
| 7,733,832 | B2 * | 6/2010 | Kwak et al. | 370/335 |
| 2003/0219037 | A1 * | 11/2003 | Toskala et al. | 370/496 |
| 2004/0082356 | A1 | 4/2004 | Walton et al. | |
| 2004/0252661 | A1 | 12/2004 | Lintulampi et al. | |
| 2005/0163056 | A1 * | 7/2005 | Ranta-Aho et al. | 370/252 |
| 2005/0239413 | A1 | 10/2005 | Wiberg et al. | |

(Continued)

FOREIGN PATENT DOCUMENTS

KR   2004-0075583   8/2004

(Continued)

OTHER PUBLICATIONS

International Search Report dated Jul. 13, 2006.

(Continued)

Primary Examiner—Rafael Pérez-Gutiérrez
Assistant Examiner—German Viana Di Prisco
(74) Attorney, Agent, or Firm—Dickinson Wright PLLC

(57) ABSTRACT

The invention relates to a mobile terminal communicating resource requests for dedicated uplink channel resources in a mobile communication system. Further, the invention also relates to a method for communicating resource requests for dedicated uplink channel resources in a mobile communication system. To allow the serving cell to detect "DOWN" commands from non-serving cells during soft handover the invention suggests a new definition of criteria for setting the "happy bit" in the control information associated to data transmitted on dedicated uplink channels. According to these criteria the mobile terminal may not indicate an unhappy condition while ramping up resource utilization. Only if resources equivalent to the maximum serving grant are utilized, the transmission buffer status requires to and the power status of the terminal allows for the happy bit is set to indicate a unhappy condition.

18 Claims, 9 Drawing Sheets

U.S. PATENT DOCUMENTS

2006/0031563 A1* 2/2006 Sebire et al. ............... 709/232
2006/0120404 A1  6/2006 Sebire et al.
2006/0159016 A1* 7/2006 Sagfors et al. ............. 370/230
2006/0215604 A1* 9/2006 Mueckenheim et al. ..... 370/329

OTHER PUBLICATIONS

3GPP TS25.401 v6.1.0, Technical Specification, 3$^{rd}$ Generation Partnership Project, Technical Specification Group Radio Access Network, UTRAN Overall Description (Release 6), www.3GPP.com, Jun. 2003, pp. 1-44.

3GPP TR25.896 v.6.0.0, Technical Specification, 3$^{rd}$ Generation Partnership Project, Technical Specification Group Radio Access Network, Feasibility Study for Enhanced Uplink for UTRA FDD (Release 6), www.3GPP.com, Mar. 2004, pp. 1-179.

"Scheduled and Autonomous Mode Operations for the Enhanced Uplink," 3GPP TSG RAN WG1#31, Tdoc R1-03-0284, Tokyo, Japan, Feb. 17-20, 2003, pp. 1-8.

3GPP TS25.309v6.2.0, Technical Specification, 3$^{rd}$ Generation Partnership Project, Technical Specification Group Radio Access Network, FDD Enhanced Uplink, Overall Description, Stage 2 (Release 6), www.3GPP.com, Mar. 2005, pp. 1-30.

3GPP TSG-RAN WG2 Meeting #48bis, "Criteria for the Happy Bit," Tdoc#R2-052358, XP-002362101, Cannes, France, Oct. 10-14, 2005, 4 pages total.

"Happy Bit with Mirroring," 3GPP TSG-RAN WG2 #46, R2-050349, Feb. 14-18, 2005, 3 pages total.

European Search Report dated Jan. 10, 2006.

Korean Office Action dated Sep. 29, 2010 with English translation.

* cited by examiner

HAPPY BIT SETTING IN A MOBILE COMMUNICATION SYSTEM

FIELD OF THE INVENTION

The invention relates to a mobile terminal communicating resource requests for dedicated uplink channel resources in a mobile communication system. Further, the invention also relates to a method for communicating resource requests for dedicated uplink channel resources in a mobile communication system.

TECHNICAL BACKGROUND

W-CDMA (Wideband Code Division Multiple Access) is a radio interface for IMT-2000 (International Mobile Communication), which was standardized for use as the $3^{rd}$ generation wireless mobile telecommunication system. It provides a variety of services such as voice services and multimedia mobile communication services in a flexible and efficient way. The standardization bodies in Japan, Europe, USA, and other countries have jointly organized a project called the $3^{rd}$ Generation Partnership Project (3GPP) to produce common radio interface specifications for W-CDMA.

The standardized European version of IMT-2000 is commonly called UMTS (Universal Mobile Telecommunication System). The first release of the specification of UMTS has been published in 1999 (Release 99). In the mean time several improvements to the standard have been standardized by the 3GPP in Release 4 and Release 5 and discussion on further improvements is ongoing under the scope of Release 6.

The dedicated channel (DCH) for downlink and uplink and the downlink shared channel (DSCH) have been defined in Release 99 and Release 4. In the following years, the developers recognized that for providing multimedia services—or data services in general—high speed asymmetric access had to be implemented. In Release 5 the high-speed downlink packet access (HSDPA) was introduced. The new high-speed downlink shared channel (HS-DSCH) provides downlink high-speed access to the user from the UMTS Radio Access Network (RAN) to the communication terminals, called user equipments in the UMTS specifications.

Hybrid ARQ Schemes

A common technique for error detection and correction in packet transmission systems over unreliable channels is called hybrid Automatic Repeat request (HARQ). Hybrid ARQ is a combination of Forward Error Correction (FEC) and ARQ.

If a FEC encoded packet is transmitted and the receiver fails to decode the packet correctly (errors are commonly detected based on a CRC (Cyclic Redundancy Check)), the receiver requests a retransmission of the packet. Commonly the transmission of additional information is called "retransmission (of a packet)", although this retransmission does not necessarily mean a transmission of the same encoded information, but could also mean the transmission of any information belonging to the packet (e.g. additional redundancy information).

Depending on the information (generally code-bits/symbols), of which the transmission is composed of, and depending on how the receiver processes the information, the following hybrid ARQ schemes are defined:

HARQ Type I

If the receiver fails to decode a packet correctly, the information of the encoded packet is discarded and a retransmission is requested. This implies that all transmissions are decoded separately. Generally, retransmissions contain identical information (code-bits/symbols) to the initial transmission.

HARQ Type II

If the receiver fails to decode a packet correctly, a retransmission is requested, where the receiver stores the information of the (erroneous received) encoded packet as soft information (soft-bits/symbols). This implies that a soft-buffer is required at the receiver. Retransmissions can be composed out of identical, partly identical or non-identical information (code-bits/symbols) according to the same packet as earlier transmissions.

When receiving a retransmission the receiver combines the stored information from the soft-buffer and the currently received information and tries to decode the packet based on the combined information. The receiver may also try to decode the transmission individually, however generally performance increases when combining transmissions.

The combining of transmissions refers to so-called soft-combining, where multiple received code-bits/symbols are likelihood combined and solely received code-bits/symbols are code combined. Common methods for soft-combining are Maximum Ratio Combining (MRC) of received modulation symbols and log-likelihood-ratio (LLR) combining (LLR combing only works for code-bits).

Type II schemes are more sophisticated than Type I schemes, since the probability for correct reception of a packet increases with receive retransmissions. This increase comes at the cost of a required hybrid ARQ soft-buffer at the receiver. This scheme can be used to perform dynamic link adaptation by controlling the amount of information to be retransmitted.

E.g. if the receiver detects that decoding has been "almost" successful, it can request only a small piece of information for the next retransmission (smaller number of code-bits/symbols than in previous transmission) to be transmitted. In this case it might happen that it is even theoretically not possible to decode the packet correctly by only considering this retransmission by itself (non-self-decodable retransmissions).

HARQ Type III

This is a subset of Type II with the restriction that each transmission must be self-decodable.

Packet Scheduling

Packet scheduling may be a radio resource management algorithm used for allocating transmission opportunities and transmission formats to the users admitted to a shared medium. Scheduling may be used in packet based mobile radio networks in combination with adaptive modulation and coding to maximize throughput/capacity by e.g. allocating transmission opportunities to the users in favorable channel conditions. The packet data service in UMTS may be applicable for the interactive and background traffic classes, though it may also be used for streaming services. Traffic belonging to the interactive and background classes is treated as non real time (NRT) traffic and is controlled by the packet scheduler. The packet scheduling methodologies can be characterized by:

- Scheduling period/frequency: The period over which users are scheduled ahead in time.
- Serve order: The order in which users are served, e.g. random order (round robin) or according to channel quality (C/I or throughput based).
- Allocation method: The criterion for allocating resources, e.g. same data amount or same power/code/time resources for all queued users per allocation interval.

The packet scheduler for uplink is distributed between Radio Network Controller (RNC) and user equipment in 3GPP UMTS R99/R4/R5. On the uplink, the air interface resource to be shared by different users is the total received power at a Node B, and consequently the task of the scheduler is to allocate the power among the user equipment(s). In current UMTS R99/R4/R5 specifications the RNC controls the maximum rate/power a user equipment is allowed to transmit during uplink transmission by allocating a set of different transport formats (modulation scheme, code rate, etc.) to each user equipment.

The establishment and reconfiguration of such a TFCS (transport format combination set) may be accomplished using Radio Resource Control (RRC) messaging between RNC and user equipment. The user equipment is allowed to autonomously choose among the allocated transport format combinations based on its own status e.g. available power and buffer status. In current UMTS R99/R4/R5 specifications there is no control on time imposed on the uplink user equipment transmissions. The scheduler may e.g. operate on transmission time interval basis.

UMTS Architecture

The high level R99/4/5 architecture of Universal Mobile Telecommunication System (UMTS) is shown in FIG. 1 (see 3GPP TR 25.401: "UTRAN Overall Description", available from http://www.3gpp.org). The network elements are functionally grouped into the Core Network (CN) 101, the UMTS Terrestrial Radio Access Network (UTRAN) 102 and the User Equipment (UE) 103. The UTRAN 102 is responsible for handling all radio-related functionality, while the CN 101 is responsible for routing calls and data connections to external networks. The interconnections of these network elements are defined by open interfaces (Iu, Uu). It should be noted that UMTS system is modular and it is therefore possible to have several network elements of the same type.

In the sequel two different architectures will be discussed. They are defined with respect to logical distribution of functions across network elements. In actual network deployment, each architecture may have different physical realizations meaning that two or more network elements may be combined into a single physical node.

FIG. 2 illustrates the current architecture of UTRAN. A number of Radio Network Controllers (RNCs) 201, 202 are connected to the CN 101. Each RNC 201, 202 controls one or several base stations (Node Bs) 203, 204, 205, 206, which in turn communicate with the user equipments. An RNC controlling several base stations is called Controlling RNC (C-RNC) for these base stations. A set of controlled base stations accompanied by their C-RNC is referred to as Radio Network Subsystem (RNS) 207, 208. For each connection between User Equipment and the UTRAN, one RNS is the Serving RNS (S-RNS). It maintains the so-called Iu connection with the Core Network (CN) 101. When required, the Drift RNS 302 (D-RNS) 302 supports the Serving RNS (S-RNS) 301 by providing radio resources as shown in FIG. 3. Respective RNCs are called Serving RNC (S-RNC) and Drift RNC (D-RNC). It is also possible and often the case that C-RNC and D-RNC are identical and therefore abbreviations S-RNC or RNC are used.

Mobility Management within Rel99/4/5 UTRAN

Before explaining some procedures connected to mobility management, some terms frequently used in the following are defined first.

A radio link may be defined as a logical association between single UE and a single UTRAN access point. Its physical realization comprises radio bearer transmissions.

A handover may be understood as a transfer of a UE connection from one radio bearer to another (hard handover) with a temporary break in connection or inclusion/exclusion of a radio bearer to/from UE connection so that UE is constantly connected UTRAN (soft handover). Soft handover is specific for networks employing Code Division Multiple Access (CDMA) technology. Handover execution may controlled by S-RNC in the mobile radio network when taking the present UTRAN architecture as an example.

The active set associated to a UE comprises a set of radio links simultaneously involved in a specific communication service between UE and radio network. An active set update procedure may be employed to modify the active set of the communication between UE and UTRAN, for example during soft-handover. The procedure may comprise three functions: radio link addition, radio link removal and combined radio link addition and removal. The maximum number of simultaneous radio links is set to eight. New radio links are added to the active set once the pilot signal strengths of respective base stations exceed certain threshold relative to the pilot signal of the strongest member within active set.

A radio link is removed from the active set once the pilot signal strength of the respective base station exceeds certain threshold relative to the strongest member of the active set. Threshold for radio link addition is typically chosen to be higher than that for the radio link deletion. Hence, addition and removal events form a hysteresis with respect to pilot signal strengths.

Pilot signal measurements may be reported to the network (e.g. to S-RNC) from UE by means of RRC signaling. Before sending measurement results, some filtering is usually performed to average out the fast fading. Typical filtering duration may be about 200 ms contributing to handover delay. Based on measurement results, the network (e.g. S-RNC) may decide to trigger the execution of one of the functions of active set update procedure (addition/removal of a Node B to/from current Active Set).

Enhanced Uplink Dedicated Channel (E-DCH)

Uplink enhancements for Dedicated Transport Channels (DTCH) are currently studied by the 3GPP Technical Specification Group RAN (see 3GPP TR 25.896: "Feasibility Study for Enhanced Uplink for UTRA FDD (Release 6)", available at http://www.3gpp.org). Since the use of IP-based services become more important, there is an increasing demand to improve the coverage and throughput of the RAN as well as to reduce the delay of the uplink dedicated transport channels. Streaming, interactive and background services could benefit from this enhanced uplink.

One enhancement is the usage of adaptive modulation and coding schemes (AMC) in connection with Node B controlled scheduling, thus an enhancement of the Uu interface. In the existing R99/R4/R5 system the uplink maximum data rate control resides in the RNC. By relocating the scheduler in the Node B the latency introduced due to signaling on the interface between RNC and Node B may be reduced and thus the scheduler may be able to respond faster to temporal changes in the uplink load. This may reduce the overall latency in communications of the user equipment with the RAN. Therefore Node B controlled scheduling is capable of better controlling the uplink interference and smoothing the noise rise variance by allocating higher data rates quickly when the uplink load decreases and respectively by restricting the uplink data rates when the uplink load increases. The coverage and cell throughput may be improved by a better control of the uplink interference.

Another technique, which may be considered to reduce the delay on the uplink, is introducing a shorter TTI (Transmission Time Interval) length for the E-DCH compared to other transport channels. A transmission time interval length of 2 ms is currently investigated for use on the E-DCH, while a transmission time interval of 10 ms is commonly used on the other channels. Hybrid ARQ, which was one of the key technologies in HSDPA, is also considered for the enhanced uplink dedicated channel. The Hybrid ARQ protocol between a Node B and a user equipment allows for rapid retransmissions of erroneously received data units, and may thus reduce the number of RLC (Radio Link Control) retransmissions and the associated delays. This may improve the quality of service experienced by the end user.

To support enhancements described above, a new MAC sub-layer is introduced which will be called MAC-e in the following (see 3GPP TSG RAN WG1, meeting #31, Tdoc R01-030284, "Scheduled and Autonomous Mode Operation for the Enhanced Uplink"). The entities of this new sub-layer, which will be described in more detail in the following sections, may be located in user equipment and Node B. On user equipment side, the MAC-e performs the new task of multiplexing upper layer data (e.g. MAC-d) data into the new enhanced transport channels and operating HARQ protocol transmitting entities.

Further, the MAC-e sub-layer may be terminated in the S-RNC during handover at the UTRAN side. Thus, the reordering buffer for the reordering functionality provided may also reside in the S-RNC.

E-DCH MAC Architecture—UE Side

FIG. 4 shows the exemplary overall E-DCH MAC architecture on UE side. A new MAC functional entity, the MAC-e/es, is added to the MAC architecture of Release '99.

The MAC interworking on the UE side is illustrated in FIG. 5. There are M different data flows (MAC-d) carrying data packets from different applications to be transmitted from UE to Node B. These data flows can have different QoS requirements (e.g. delay and error requirements) and may require different configuration of HARQ instances. Each MAC-d flow represents a logical unit to which specific physical channel (e.g. gain factor) and HARQ (e.g. maximum number of retransmissions) attributes can be assigned.

Further, MAC-d multiplexing is supported for an E-DCH, i.e. several logical channels with different priorities may be multiplexed onto the same MAC-d flow. Data of multiple MAC-d flows can be multiplexed in one MAC-e PDU. In the MAC-e header, the DDI (Data Description Indicator) field identifies logical channel, MAC-d flow and MAC-d PDU size. A mapping table is signalled over RRC, to allow the UE to set DDI values. The N field indicates the number of consecutive MAC-d PDUs corresponding to the same DDI value.

The MAC-e/es entity is depicted in more detail in FIG. 6. The MAC-es/e handles the E-DCH specific functions. The selection of an appropriate transport format for the transmission of data on E-DCH is done in the E-TFC Selection entity, which represents a function entity. The transport format selection is done according to the scheduling information (Relative Grants and Absolute Grants) received from UTRAN via L1, the available transmit power, priorities, e.g. logical channel priorities. The HARQ entity handles the retransmission functionality for the user. One HARQ entity supports multiple HARQ processes. The HARQ entity handles all HARQ related functionalities required. The multiplexing entity is responsible for concatenating multiple MAC-d PDUs into MAC-es PDUs, and to multiplex one or multiple MAC-es PDUs into a single MAC-e PDU, to be transmitted at the next TTI, and as instructed by the E-TFC selection function. It is also responsible for managing and setting the TSN per logical channel for each MAC-es PDU. The MAC-e/es entity receives scheduling information from Node B (network side) via Layer 1 signaling as shown in FIG. 6. Absolute grants are received on E-AGCH (Enhanced Absolute Grant Channel), relative grants are received on the E-RGCH (Enhanced Relative Grant Channel).

E-DCH MAC Architecture—UTRAN Side

An exemplary overall UTRAN MAC architecture is shown in FIG. 7. The UTRAN MAC architecture includes a MAC-e entity and a MAC-es entity. For each UE that uses an E-DCH, one MAC-e entity per Node-B and one MAC-es entity in the S-RNC are configured. The MAC-e entity is located in the Node B and controls access to the E-DCH. Further, the MAC-e entity is connected to MAC-es located in the S-RNC.

In FIG. 8 the MAC-e entity in Node B is depicted in more detail. There is one MAC-e entity in Node B for each UE and one E-DCH scheduler function in the Node-B for all UEs. The MAC-e entity and E-DCH scheduler handle HSUPA (High-Speed Uplink Packet Access) specific functions in Node B. The E-DCH scheduling entity manages E-DCH cell resources between UEs. Commonly, scheduling assignments are determined and transmitted based on scheduling requests from the UEs. The De-multiplexing entity in the MAC-e entity provides de-multiplexing of MAC-e PDUs. MAC-es PDUs are then forwarded to the MAC-es entity in the S-RNC.

One HARQ entity is capable of supporting multiple instances (HARQ processes), e.g. employing a stop and wait HARQ protocols. Each HARQ process is assigned a certain amount of the soft buffer memory for combining the bits of the packets from outstanding retransmissions. Furthermore each process is responsible for generating ACKs or NACKs indicating delivery status of E-DCH transmissions. The HARQ entity handles all tasks that are required for the HARQ protocol.

In FIG. 9 the MAC-es entity in the S-RNC is shown. It comprises the reordering buffer which provides in-sequence delivery to RLC and handles the combining of data from different Node Bs in case of soft handover. The combining is referred to as Macro diversity selection combining.

It should be noted that the required soft buffer size depends on the used HARQ scheme, e.g. an HARQ scheme using incremental redundancy (IR) requires more soft buffer than one with chase combining (CC).

E-DCH—Node B Controlled Scheduling

Node B controlled scheduling is one of the technical features for E-DCH which may enable more efficient use of the uplink resources in order to provide a higher cell throughput in the uplink and may increase the coverage. The term "Node B controlled scheduling" denotes the possibility for a Node B to control uplink resources, e.g. the E-DPDCH/DPCCH power ratio, which the UE may use for uplink transmissions on the E-DCH within limits set by the S-RNC. Node B controlled scheduling is based on uplink and downlink control signaling together with a set of rules on how the UE should behave with respect to this signaling.

In the downlink, a resource indication (scheduling grant) is required to indicate to the UE the (maximum) amount of uplink resources it may use. When issuing scheduling grants, the Node B may use QoS-related information provided by the S-RNC and from the UE in the scheduling requests to determine the appropriate allocation of resources for servicing the UE at the requested QoS parameters.

For the UMTS E-DCH, there are commonly two different UE scheduling modes defined depending on the type of scheduling grants used. In the following the characteristics of the scheduling grants are described.

Scheduling Grants

Scheduling grants are signaled in the downlink in order to indicate the (maximum) resource the UE may use for uplink transmissions. The grants affect the selection of a suitable transport format (TF) for the transmission on the E-DCH (E-TFC selection). However, they usually do not influence the TFC selection (Transport Format Combination) for legacy dedicated channels.

There are commonly two types of scheduling grants which are used for the Node B controlled scheduling:
  absolute grants (AGs), and
  relative grants (RGs)

The absolute grants provide an absolute limitation of the maximum amount of uplink resources the UE is allowed to use for uplink transmissions. Absolute grants are especially suitable to rapidly change the allocated UL resources.

Relative grants are transmitted every TTI (Transmission Time Interval). They may be used to adapt the allocated uplink resources indicated by absolute grants by granular adjustments: A relative grant indicates the UE to increase or decrease the previously allowed maximum uplink resources by a certain offset (step).

Absolute grants are only signaled from the E-DCH serving cell. Relative grants can be signaled from the serving cell as well as from a non-serving cell. The E-DCH serving cell denotes the entity (e.g. Node B) actively allocating uplink resources to UEs controlled by this serving cell, whereas a non-serving cell can only limit the allocated uplink resources, set by the serving cell. Each UE has only one serving cell.

Absolute grants may be valid for a single UE. An absolute grant valid for a single UE is referred to in the following as a "dedicated grant. Alternatively, an absolute grant may also be valid for a group of or all UEs within a cell. An absolute grant valid for a group of or all UEs will be referred to as a "common grant" in the following. The UE does not distinguish between common and dedicated grants.

Relative grants can be sent from serving cell as well as from a non-serving cell as already mentioned before. A relative grant signaled from the serving cell may indicate one of the three values, "UP", "HOLD" and "DOWN". "UP" respectively "DOWN" indicates the increase/decrease of the previously maximum used uplink resources (maximum power ratio) by one step. Relative grants from a non-serving cell can either signal a "HOLD" or "DOWN" command to the UE. As mentioned before relative grants from non-serving cells can only limit the uplink resources set by the serving cell (overload indicator) but can not increase the resources that can be used by a UE.

UE Scheduling Operation

Two different UE scheduling mode operations are defined for E-DCH, "RG" based and "non-RG" based mode of operation.

In the RG based mode, the UE obeys relative grants from the E-DCH serving cell. The RG based scheduling mode is also often referred to as the dedicated rate control mode, because the scheduling grants usually address a single UE in the most cases.

In the following the UE behavior in this RG based scheduling mode is described. The UE maintains a serving grant (SG) for each HARQ process. The serving grant indicates the maximum power ratio (E-DPDCH/DPCCH) the UE is allowed to use for transmissions on the E-DCH and is for the selection of an appropriate TFC during E-TFC selection. The serving grant is updated by the scheduling grants signaled from serving/non-serving cells. When the UE receives an absolute grant from the serving cell the serving grant is set to the power ratio signaled in the absolute grant. The absolute grant can be valid for each HARQ process or only for one HARQ process.

When no absolute grant is received from the serving cell the UE should follow the relative grants from the serving cell, which are signaled every TTI. A serving relative grant is interpreted relative to the UE power ratio in the previous TTI for the same hybrid ARQ process as the transmission, which the relative grant will affect. FIG. 10 illustrates the timing relation for relative grants. In FIG. 10 it is assumed for exemplary purposes that there are four HARQ processes. The relative grant received by the UE, which affects the serving grant of the first HARQ process, is relative to the first HARQ process of the previous TTI (reference process).

The UE behavior in accordance to serving E-DCH relative grants is shown in the following:

When the UE receives an "UP" command from Serving E-DCH Radio Link Set (RLS):

New $SG_i$=Last used power ratio $(i)$+Delta;

When the UE receives a "DOWN" command from Serving E-DCH RLS:

New $SG_i$=Last used power ratio $(i)$−Delta;

The "UP" and "DOWN" command is relative to the power ratio used for E-DCH transmission in the reference HARQ process. The new serving grant of the HARQ process j, affected by the relative grant, is an increase respectively decrease of the last used power ratio in the reference HARQ process.

The "HOLD" command indicates either that the SG of HARQ process j remains unchanged or that the SG of the reference HARQ process in the immediate preceding TTI is reused for the current TTI for all HARQ processes.

As already mentioned before a Node B from a non-serving RLS is only allowed to send relative grants, which can either indicate a "HOLD" or "DOWN". The "DOWN" command enables non-serving cells to limit the intercell-interference caused by UEs which are in SHO with these non-serving cells. The UE behavior upon reception of non-serving relative grants is as follows:

When the UE receives a "DOWN" from at least one Non-serving E-DCH RLS:

For all HARQ processes (for all $i$): new $SG_i$=Last used power ratio $(i)$−Delta Relative grants from a non-serving RLS affect all HARQ processes in the UE. The amount of the reduction of the used power ratio might be static or depending on the bit rate, for higher bit rates there might be a larger step size (Delta).

Next, the non-RG based scheduling mode will be outlined in further detail. In case that there are relative grant channels (E-RGCH) established from the serving E-DCH RLS, the UE follows the non-RG based mode of operation. The non-RG based scheduling mode is also referred to as common rate control mode.

The idea is to serve a group of or all UEs in the cell by common absolute grants. The common rate control has the advantage over dedicated rate control scheduling that less downlink signaling from serving RLS perspective is needed, only common absolute grants and also no relative grants.

However the use of common absolute grants to schedule an entire cell inevitably leads to a need for caution when new UEs start to transmit. If an absolute grant is issued with e.g. 64 kbps, hardware and RoT (Rise over Thermal) resources cannot be reserved for all UEs connected in the cell. Therefore when a new UE becomes active, it needs to start transmissions at a low power ratio (i.e. using a low amount of uplink resources) to enable dynamic allocation of hardware and RoT resources by the Node B. This process is called UE ramping in the following: the UE autonomously ramps up its resource usage towards the maximum resources indicated by the latest absolute grant. The step sizes of the UE ramping are for example configured by RRC (Radio Resource Control).

The UE acts upon the absolute grant from serving RLS as follows:
- The UE maintains a "serving grant" (SG), which is used in the E-TFC selection algorithm as the maximum allowed E-DPDCH/DPCCH power ratio for the uplink transmissions on the HARQ process it refers to
- The UE furthermore maintains a "maximum serving grant" (MAX SG) which is set to the last received absolute grant for all HARQ processes
- If the UE has data to transmit and the SG is below the MAX SG, the SG is increased over time by configurable steps (autonomous ramp-up) until SG is equal to MAX SG
- If the SG is above the MAX SG (due to reception of a new absolute grant lowering the MAX SG), then the SG is immediately set equal to MAX SG
- If the UE transmitted at a given power ratio below the current SG for more than n TTIs (where n is a configurable parameter that can be set to an infinite value), then the SG is set equal to this given power ratio. This in effect forces the UE to use autonomous ramp-up after some continuous activity below SG.

The UE ramps up towards the last received absolute grant for example at the beginning of a connection and after some certain period of time (Δt), during which the UE is transmitting with a lower power ratio than allocated by serving cell.

The relative grants from non-serving RLS affect the MAX SG of a UE.
- When the UE receives a "DOWN" from at least one Non-serving E-DCH RLS new MAX SG=MAX SG−Delta The difference of the UE behavior for the non-RG based scheduling mode compared to the RG based scheduling mode with respect to relative grants from a non-serving RLS is that the relative grants affect the MAX SG instead of the last used power ratio. Therefore the UE is still allowed to ramp-up to the reduced MAX SG. When no more "DOWN" commands from a non-serving RLS is received the UE sets the MAX SG to the last received absolute grant and ramps towards this MAX SG.

An exemplary scenario for the non-RG based mode is shown in FIG. 11. The UE is in soft handover and transmits the uplink data in four HARQ processes, numbered 1, 2, 3 and 4 to a serving cell and a non-serving cell. Upon starting communication, MAX SG is equal to AG, and SG is increased step-wise until reaching MAX SG.

Upon reaching MAX SG, the non-serving cell sends a "DOWN" command to the UE in order to request same to reduce the uplink resources utilized. The UE sets the new MAX SG equal to AG minus a configurable delta, and transmits the next uplink data for processes 1 to 4 with this reduced MAX SG value (i.e. MAX SG=SG). Upon expiry of a predetermined time period (Δt) the MAX SG is reset to AG. Again, the non-serving cell requests a reduction of the utilized uplink resources and the UE reacts upon the further "DOWN" commands from the non-serving cell as explained above.

Rate Request Signaling

In order to enable Node B to schedule efficiently while considering also the QoS requirements of a service mapped on the E-DCH, an UE provides the Node B information on its QoS requirements by means of rate request signaling.

There are two kinds of rate request signaling information on the uplink: the so called "happy bit", which is a flag related to a rate request on the E-DPCCH and the scheduling information (SI), which is commonly sent in-band on the E-DCH.

From a system point of view, the one-bit rate request may be advantageously used by the serving cell to effect small adjustments in the resource allocation for example by means of relative grants. On the contrary, scheduling information may advantageously be employed for making longer term scheduling decisions, which would be reflected in the transmission of an absolute grant. Details on the two rate request signaling methods are provided in the following.

Scheduling Information Sent on E-DCH

As mentioned before the scheduling information should provide Node B information on the UE status in order to allow for an efficient scheduling. Scheduling information may be included in the header of a MAC-e PDU. The information is commonly sent periodically to Node B in order to allow the Node B to keep track of the UE status. E.g. the scheduling information comprises following information fields:
- Logical channel ID of the highest priority data in the scheduling information
- UE buffer occupancy (in Bytes)
  - Buffer status for the highest priority logical channel with data in buffer
  - Total buffer status
- Power status information
  - Estimation of the available power ratio versus DPCCH (taking into account HS-DPCCH). UE should not take power of DCHs into account when performing the estimation Identifying the logical channel by the logical channel ID from which the highest priority data originates may enable the Node B to determine the QoS requirements, e.g. the corresponding MAC-d flow power offset, logical channel priority or GBR (Guaranteed Bit Rate) attribute, of this particular logical channel. This in turn enables the Node B to determine the next scheduling grant message required to transmit the data In the UE buffer, which allows for a more precise grant allocation. In addition to the highest priority data buffer status, it may be beneficial for the Node B to have some information on the total buffer status. This information may help in making decisions on the "long-term" resource allocation.

In order for the serving Node B to be able to allocate uplink resources effectively, it needs to know up to what power each UE is able to transmit. This information could be conveyed in the form of a "power headroom" measurement, indicating how much power the UE has left over on top of that what is used for DPCCH transmissions (power status). The power status report could also be used for the triggering of a TTI reconfiguration, e.g. switching between 2 ms and 10 ms TTI and vice versa.

Happy Bit

As already explained above the happy bit denotes a one-bit rate request related flag, which is sent on the E-DPCCH. The "happy bit" indicates whether the respective UE is "happy" or "unhappy" with the current serving grant (SG).

The UE indicates that it is "unhappy", if both of the following criteria are met:

Power status criterion: UE has power available to send at higher data rates (E-TFCS) and Buffer occupancy criterion: Total buffer status would require more than n TTIs with the current Grants (where n is configurable).

Otherwise, the UE indicates that it is "happy" with the current serving grant.

As described above serving and non-serving RLS may control the maximum serving grant by means of scheduling grants in the non-RG based scheduling mode. The maximum serving grant in the UE is set to the last received absolute grant from serving RLS, a "DOWN" command from a non-serving RLS decreases the maximum serving grant by one step. In case a "DOWN" command is received while UE is ramping up and the serving grant is below the maximum serving grant, the UE is still allowed to ramp up to the new MAX SG=MAX SG−Delta.

Moreover, as has been outlined, the happy/unhappy status of the UE basically indicates to the serving cell, whether the UE is capable of transmitting with a higher data rate respectively higher power ratio than currently allowed by the serving grant. Essentially the happy bit provides the serving cell with some information on the power and buffer status of the respective UE. The Node B scheduler may adjust the allowed uplink resources for example by a particular UE by relative grants in response to the happy-bit set by the UE.

Next, the RG based scheduling mode is referred to. Table 1 below shows some exemplary scenarios of the power headroom available to a UE, its buffer status, the setting of the happy-bit according to these two parameters and the scheduling command that should be sent next by the Node B controlling the serving cell on the E-RGCH (E-DCH Relative Grant Channel).

| Case | Power headroom | Buffer status | Happy bit | E-RGCH |
|---|---|---|---|---|
| 1 | + | + | Unhappy | Up |
| 2 | + | − | Happy | Keep |
| 3 | − | + | Happy | Keep |
| 4 | − | − | Happy | Keep |

"+/−" for power headroom corresponds to the case when UE has more/less available power than allowed by the serving grant. "+/−" for the buffer status corresponds to the case when buffered data requires more/less than n TTIs for its transmission at the allowed serving grant. Upon receiving the happy bit, Node B scheduler determines the relative grant, which is sent on the E-RGCH. In case the UE is unhappy and there are uplink resources available serving cell could up-rate the UE by an "UP" command, as shown in case 1.

By considering the received E-TFC on the E-DPDCH together with the "happy bit", the serving cell can determine when a "DOWN" command has been sent from non-serving RLS. In case the UE indicates "unhappy" but transmits in the same TTI with less power than actually granted by the serving grants, the serving cell can recognize that a "DOWN" command has been signaled from a non-serving RLS. This situation is shown in Table 2 below (case 4).

| Case | power headroom | power limited by | Buffer status | Happy bit | E-TFC | E-RGCH |
|---|---|---|---|---|---|---|
| 1 | + | Serving Node B | + | UH | MAX | Up |
| 2 | − | UE | + | H | LESS | Keep |
| 3 | − | UE | − | H | LESS | Keep |
| 4 | + | Non-Serving Node B | + | UH | LESS | Keep |

By taking the happy/unhappy status of the UE and the received E-TFC into account the serving cell can distinguish between case 1 and case 4 and hence detect "DOWN" commands from a non-serving RLS. The possibility to detect a "DOWN" command from a non-Serving Node B enables the serving RLS to react appropriately, for example by restricting the data rate of UEs in soft handover between the serving cell and the non-serving cell that has sent the "DOWN" command.

For the non-RG based scheduling mode, the situation is different. Scheduling grants from serving/non-serving RLS control the maximum serving grant of a UE—in contrast to the RG based scheduling mode, where the serving grant is controlled by scheduling grants. However the definition of the happy bit is based on the serving grant and not on the maximum serving grant used in the non-RG scheduling mode. During the ramping procedure the serving grant is below the maximum serving grant. When UE is ramping up towards the maximum serving grant it can transmit with a higher power (i.e. "higher" E-TFC) than allowed by the current serving grant. Therefore according to the criteria of the unhappy status defined previously, the UE would indicate "unhappy" to the serving cell. However this behavior would not reflect the real situation, because the UE is allowed to transmit with higher power than the current serving grant: it is basically allowed to ramp up the power ration for E-DCH transmission autonomously up to the maximum serving grant.

One further important drawback with this behavior would be that serving cell cannot distinguish anymore whether a "DOWN" command from a non-serving RLS has been sent limiting the maximum uplink data rate of a UE or the fact that the UE is currently ramping up towards maximum serving grant. Therefore, the serving cell may no longer take appropriate countermeasures when non-serving Node Bs send "DOWN" commands.

SUMMARY OF THE INVENTION

The object of the invention is to provide new criteria for setting the happy bit. A further aim is to enable the Node B of the serving cell to detect "DOWN" commands from other non-serving cells during soft handover.

The object is solved by the subject matter of the independent claims. Advantageous embodiments of the invention are subject matters to the dependent claims.

One of the main aspects of the invention is the definition of new criteria for setting the happy bit. In contrast to the conventional criteria, a mobile terminal is only allowed to set the happy bit to "unhappy", i.e. may only request additional uplink resources by setting the bit, if the mobile terminal is not ramping its uplink resource utilization. Hence, only if the mobile terminal utilizes the maximum uplink resources granted by the serving cell, the mobile terminal may indicate an "unhappy" status. Another effect achieved by this definition of criteria for setting the "unhappy" bit is that serving cell is capable of detecting during handover, if a non-serving cell in the mobile terminal's active set during soft handover has indicated to reduce the uplink resource utilization.

According to an advantageous embodiment, a method for communicating resource requests for dedicated uplink channel resources in a mobile communication system is provided. According to this method, the mobile terminal transmits uplink data to a base station via a dedicated uplink channel at a transmission power utilizing a corresponding amount of uplink resources per transmission time interval and uplink control information associated to the uplink data transmitted within a transmission time interval via a dedicated uplink control channel to the base station. Further, the mobile terminal receives a scheduling grant setting the maximum amount of uplink resources the mobile terminal is allowed to utilize for the transmission of uplink data via the uplink dedicated channel within a transmission time interval from the base station controlling the serving cell.

If the amount of uplink resources utilized for uplink data transmission is lower than the maximum amount of uplink resources, the mobile terminal may increase the amount of uplink resources utilized for uplink data transmissions via the dedicated uplink channel step-wise until the utilized amount of uplink resources is equivalent to the maximum amount of uplink resources.

The control information transmitted by the mobile terminal comprises a resource request flag that, when set, requests the base station controlling the serving cell to increase the uplink resources for uplink data transmissions via the uplink dedicated channel. The mobile terminal may not set the resource request flag, if the mobile terminal transmits uplink data via the dedicated uplink channel not utilizing the maximum amount of uplink resources set by a scheduling grant and if the mobile terminal is in a process of step-wise increasing the amount of uplink resources utilized for uplink data transmissions.

In a further embodiment of the invention, the mobile terminal may further determine the occupancy of a buffer in the mobile terminal. The buffer buffers data to be transmitted via the dedicated uplink channel. The mobile terminal sets the resource request flag to request the base station to increase the uplink resources for uplink data transmissions via the uplink dedicated channel,
a) if the power status of the mobile terminal allows for uplink data transmission via the dedicated uplink channel utilizing more uplink resources than the maximum uplink resources set by the scheduling grant of the base station controlling the serving cell,
b) and if the maximum uplink resources set by the scheduling grant from the base station controlling the serving cell require more than a configurable number of transmission time intervals for transmitting buffered uplink data via the dedicated uplink channel,
c) and if the mobile terminal is currently utilizing the maximum uplink resources set by the scheduling grant for uplink data transmission.

According to another embodiment of the invention, the scheduling grant indicates the maximum uplink resources all mobile terminals controlled by the base station of the serving cell transmitting data via a dedicated uplink channel respectively are allowed to utilize for uplink data transmissions via the uplink dedicated channels within a transmission time interval.

Another advantageous embodiment relates to situations in which the mobile terminal is in soft handover between the serving cell controlled by the base station and a non-serving cell controlled by a base station. In this embodiment, the mobile terminal may further transmit the uplink data via a dedicated uplink channel to the base station controlling the non-serving cell, and may set the maximum uplink resources the mobile terminal is allowed to utilize for uplink data transmissions via both dedicated uplink channels according to the scheduling grant received from the base station controlling the serving cell.

In a variation of this embodiment of the invention, the mobile terminal may further receive a relative scheduling grant from the base station controlling the non-serving cell indicating to decrease the amount of uplink resources currently utilized by the mobile terminal. The mobile terminal may decrease the amount of uplink resources currently utilized by the mobile terminal in response to the relative scheduling grant, and may set the maximum amount of uplink resources to a decreased amount of uplink resources for uplink data transmission in the next transmission time interval.

In a further variation of this embodiment of the invention, the mobile terminal further sets the resource request flag to request the base station to increase the uplink resources for uplink data transmissions via the uplink dedicated channel,
a) if the power status of the mobile terminal allows for uplink data transmission via the dedicated uplink channel utilizing more uplink resources than the maximum uplink resources set by scheduling grants from the serving cell and/or the non-serving cell,
b) and if the maximum uplink resources set by the scheduling grants requires more than a configurable number of transmission time intervals for transmitting buffered uplink data via the dedicated uplink channel,
c) and if the mobile terminal is currently utilizing the maximum uplink resources set by the scheduling grants for uplink data transmission.

In another variation of the embodiment, the control information transmitted via the dedicated control channel to the base station controlling the serving cell further comprises a transport format indicator indicating the transport format combination used for transmitting uplink data to the base station controlling the serving cell within a transmission time interval. The transport format indicator indicates a transport format combination utilizing a lower amount of uplink resources than allowed by the base station of the serving cell in the scheduling grant. If the mobile terminal is transmitting uplink data via the uplink dedicated channel to the base station controlling the serving cell utilizing the decreased amount of uplink resources, it may set the resource request flag in the control information transmitted in the transmission time interval to the base station controlling the serving cell.

This combination of the transport format indicator and the resource request flag in the control information indicates to the base station controlling the serving cell that the maximum amount of uplink resources has been decreased based on a relative scheduling grant received from the base station controlling the non-serving cell.

In a further embodiment, the step size when step-wise increasing the amount of uplink resources is configurable. For example, the mobile terminal may receive control information via higher layer signaling indicating the step size to use and may set the step size according to the control information.

In a variation of this embodiment of the invention, the control information indicating the step size may set the step size to a value equal to the difference between the maximum amount of resources the mobile terminal is allowed to utilize and the amount of uplink resources currently utilized by the mobile terminal.

Another embodiment of the invention relates to a mobile terminal communicating resource requests for dedicated uplink channel resources in a mobile communication system. The mobile terminal may comprise a transmitter for transmitting uplink data to a base station via a dedicated uplink channel at a transmission power utilizing a corresponding amount of uplink resources per transmission time interval, and for transmitting uplink control information associated to the uplink data transmitted within a transmission time interval via a dedicated uplink control channel to the base station.

The mobile terminal may further comprise a receiver for receiving a scheduling grant setting the maximum amount of uplink resources the mobile terminal is allowed to utilize for the transmission of uplink data via the uplink dedicated channel within a transmission time interval from the base station controlling the serving cell, and a processing means for step-wise increasing the amount of uplink resources utilized for uplink data transmissions via the dedicated uplink channel until the utilized amount of uplink resources is equivalent to the maximum amount of uplink resources, if the amount of uplink resources utilized for uplink data transmission is lower than the maximum amount of uplink resources According to this embodiment, the control information comprises a resource request flag that, when set, requests the base station controlling the serving cell to increase the uplink resources for uplink data transmissions via the uplink dedicated channel. The mobile terminal is adapted to not set the resource request flag, if the mobile terminal transmits uplink data via the dedicated uplink channel without utilizing the maximum amount of uplink resources set by a scheduling grant and if the mobile terminal is in a process of step-wise Increasing the amount of uplink resources utilized for uplink data transmissions.

A further embodiment of the invention relates to the mobile terminal comprising means adapted to perform the steps of the method according to one of the different embodiments and variations thereof above.

Further another embodiment of the invention provides a computer readable medium storing instructions that, when executed by a processor of a mobile terminal, cause the mobile terminal to communicate resource requests for dedicated uplink channel resources in a mobile communication system. The mobile terminal is caused to communicate resource requests by transmitting uplink data to a base station via a dedicated uplink channel at a transmission power utilizing a corresponding amount of uplink resources per transmission time interval, transmitting uplink control information associated to the uplink data transmitted within a transmission time interval via a dedicated uplink control channel to the base station, receiving a scheduling grant setting the maximum amount of uplink resources the mobile terminal is allowed to utilize for the transmission of uplink data via the uplink dedicated channel within a transmission time interval from the base station controlling the serving cell, and step-wise increasing the amount of uplink resources utilized for uplink data transmissions via the dedicated uplink channel until the utilized amount of uplink resources is equivalent to the maximum amount of uplink resources, if the amount of uplink resources utilized for uplink data transmission is lower than the maximum amount of uplink resources.

The control information comprises a resource request flag that, when set, requests the base station controlling the serving cell to increase the uplink resources for uplink data transmissions via the uplink dedicated channel. Moreover, the instructions cause the mobile terminal to not set the resource request flag, if the mobile terminal transmits uplink data via the dedicated uplink channel not utilizing the maximum amount of uplink resources set by a scheduling grant and if the mobile terminal is in a process of step-wise increasing the amount of uplink resources utilized for uplink data transmissions.

Another embodiment of the invention relates to a computer readable medium storing instructions that, when executed by the processor of the mobile terminal cause the mobile terminal to perform the steps of the method according to one the various embodiments and variations thereof described herein.

BRIEF DESCRIPTION OF THE FIGURES

In the following the invention is described in more detail in reference to the attached figures and drawings. Similar or corresponding details in the figures are marked with the same reference numerals.

DETAILED DESCRIPTION OF THE INVENTION

Figure 1:
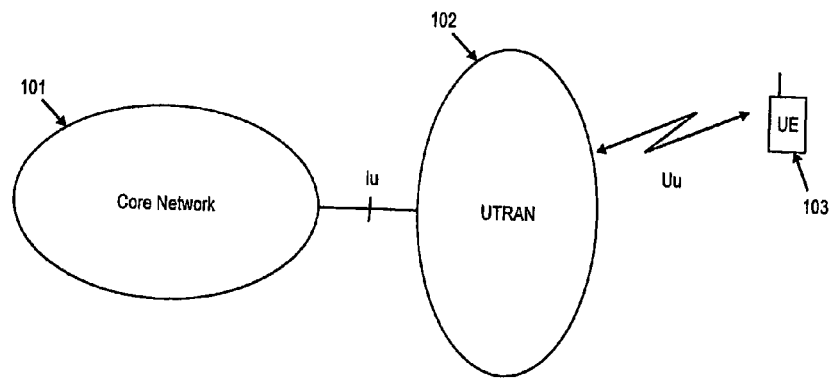
FIG. 1 shows the high-level architecture of UMTS.
Figure 2:
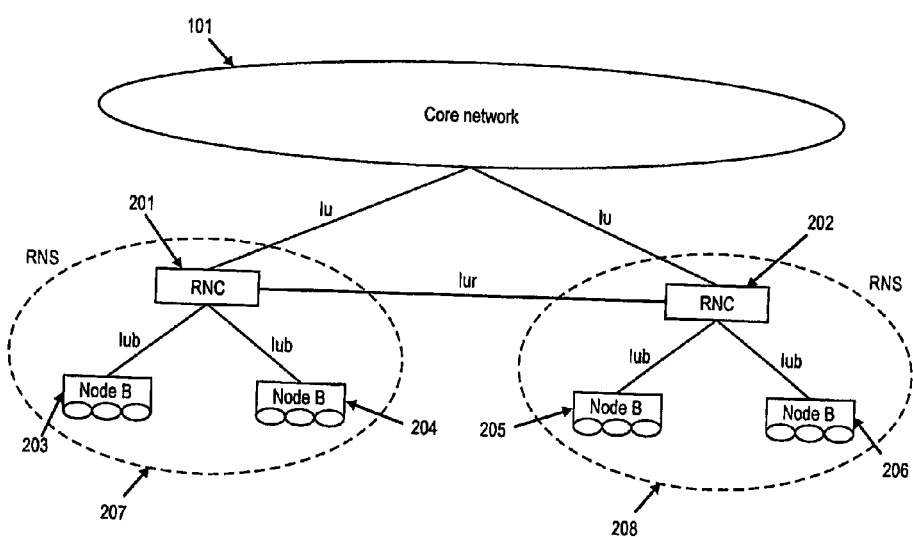
FIG. 2 shows the architecture of the UTRAN according to UMTS R99/4/5.
Figure 3:
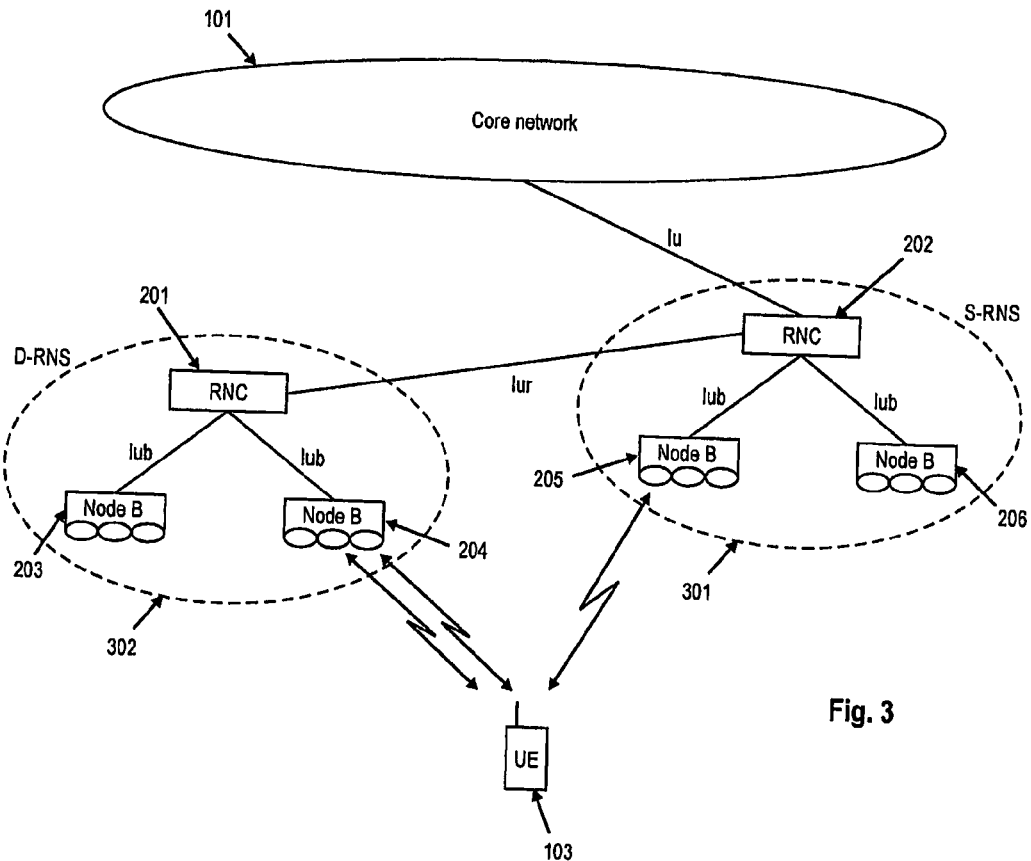
FIG. 3 shows a Drift and a Serving Radio Subsystem.
Figure 4:
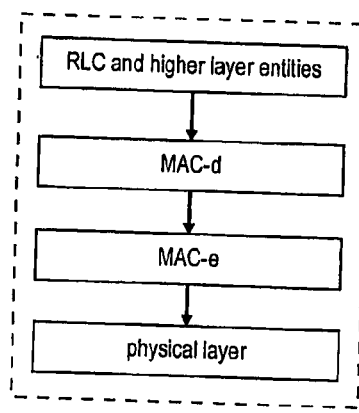
FIG. 4 shows the overall E-DCH MAC architecture at a user equipment.
Figure 5:
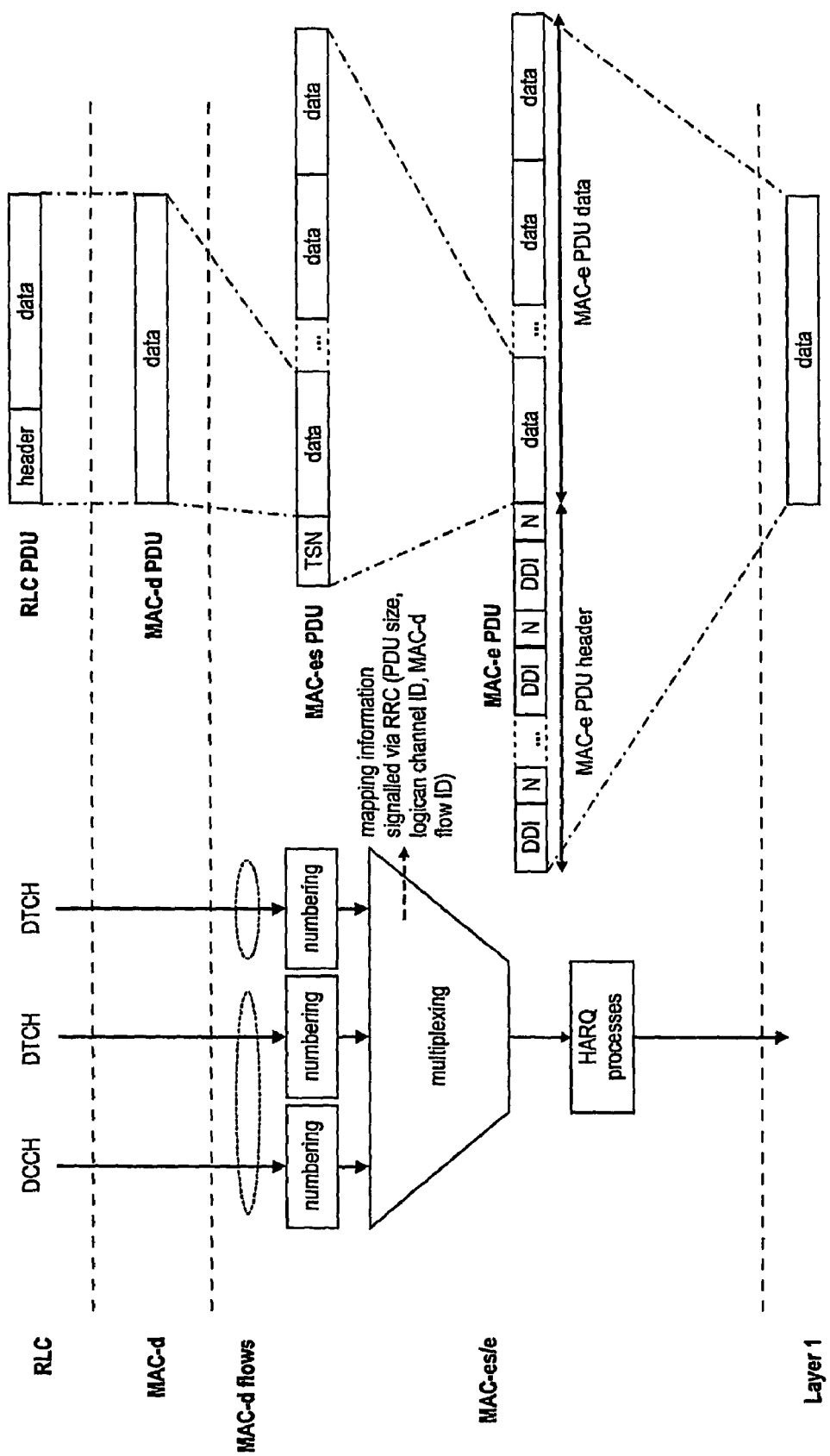
FIG. 5 shows the MAC interworking in a simplified architecture at a user equipment.
Figure 6:
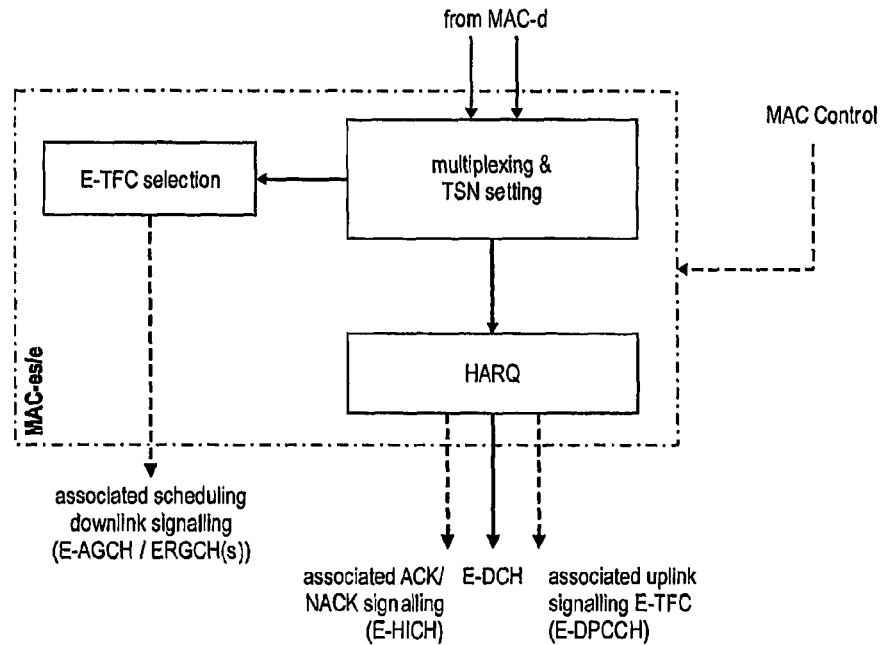
FIG. 6 shows the MAC-e/es architecture at a user equipment.
Figure 8:
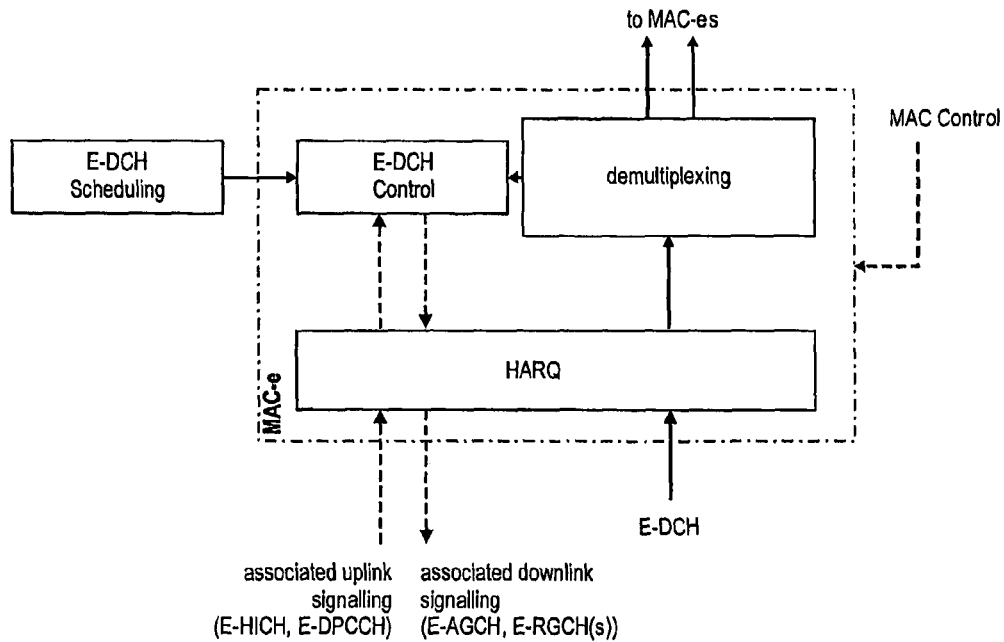
FIG. 8 shows the MAC-e architecture at a Node B.
Figure 7:
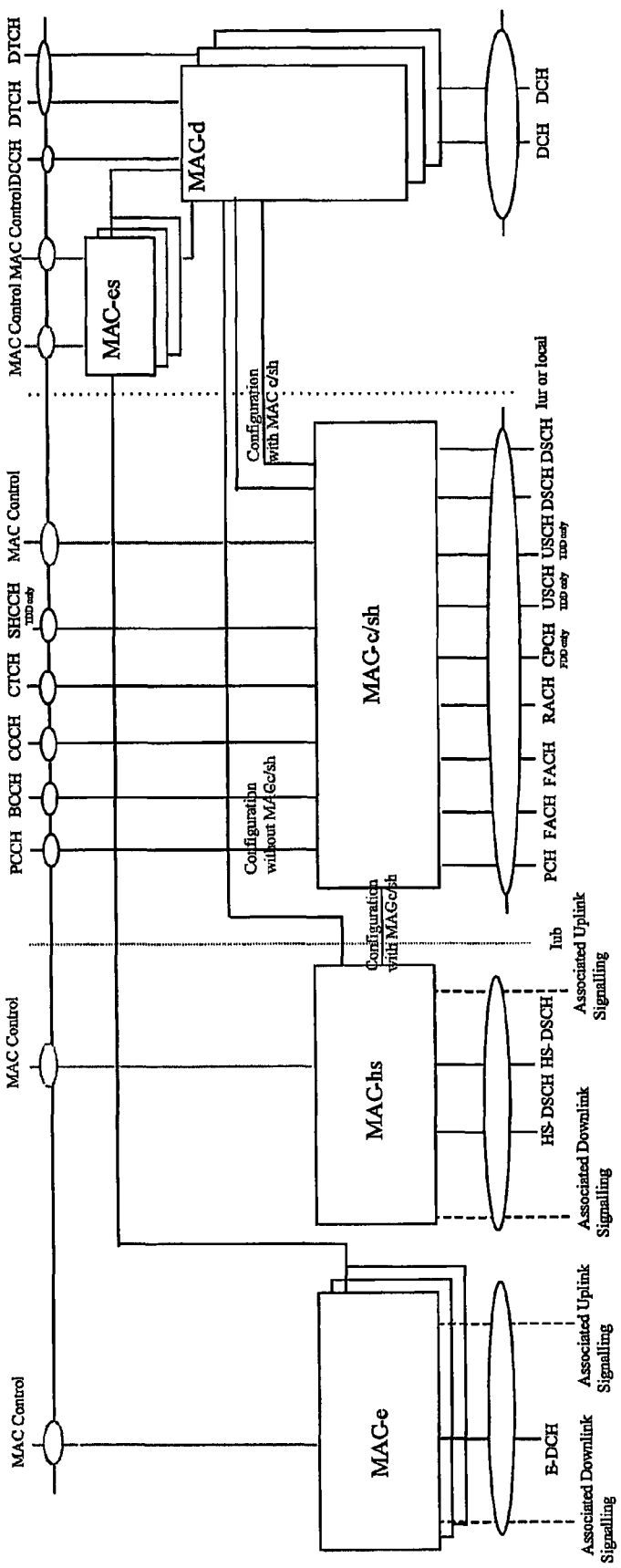
FIG. 7 shows an overall MAC architecture in the UTRAN.
Figure 9:
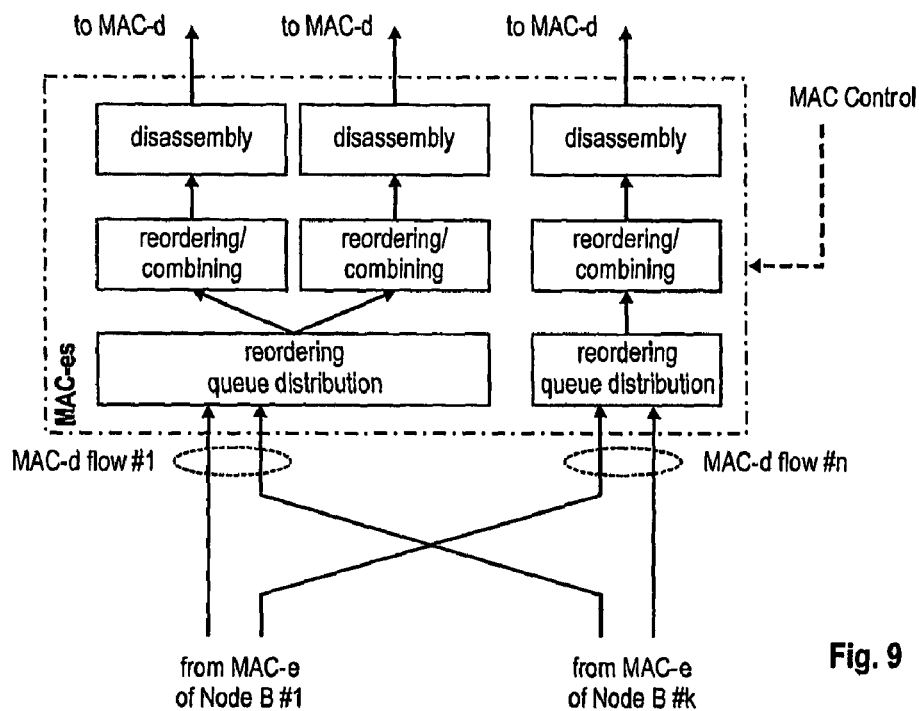
FIG. 9 shows the MAC-es architecture at a S-RNC.
Figure 10:
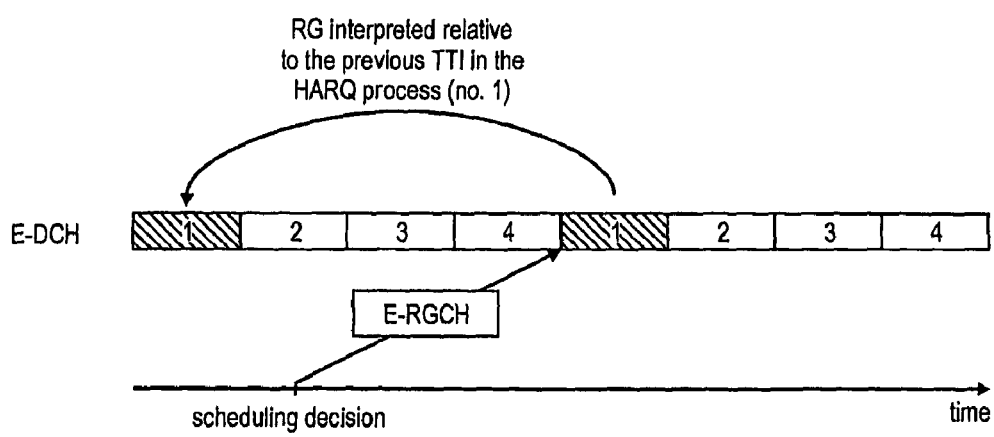
FIG. 10 shows the timing relation of relative grant.
Figure 11:
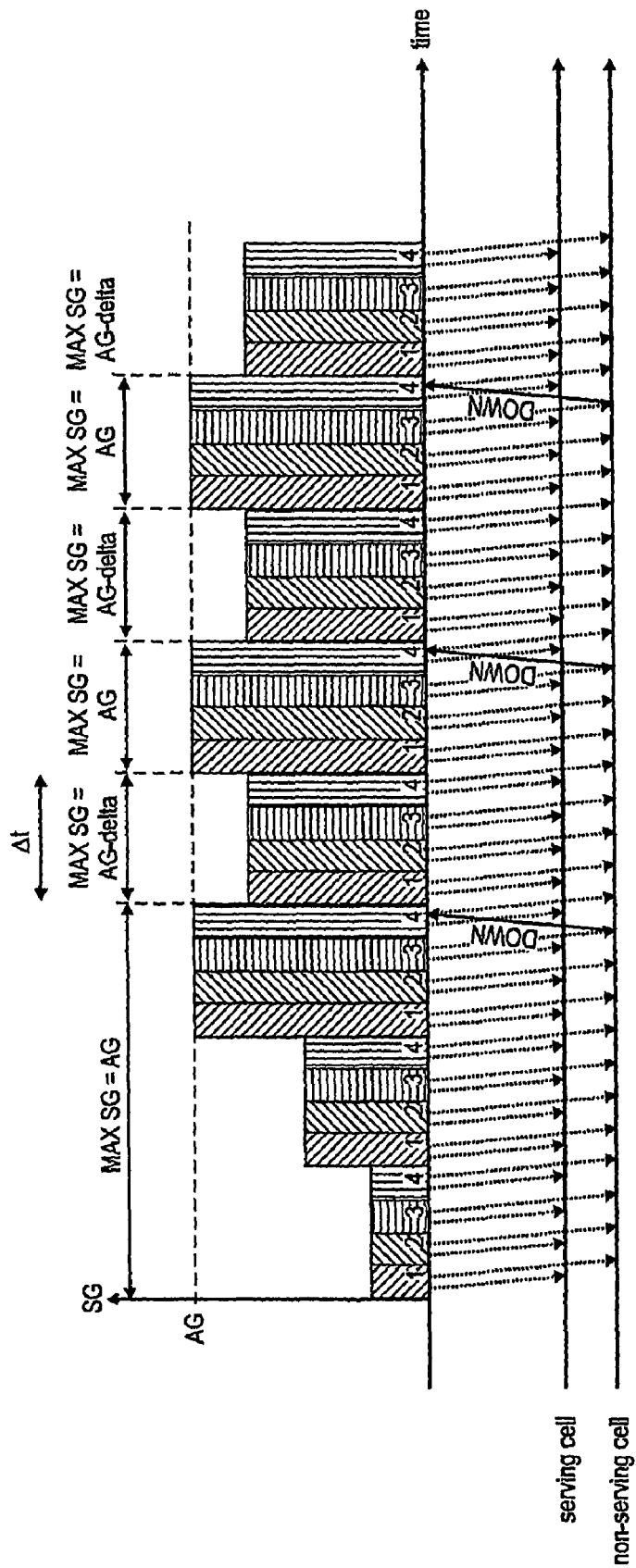
FIG. 11 shows the non-RG mode operation of a UE.

The following paragraphs will describe various embodiments of the invention. For exemplary purposes only, most of the embodiments are outlined in relation to a UMTS communication system and the terminology used in the subsequent sections mainly relates to the UMTS terminology. However, the used terminology and the description of the embodiments with respect to a UMTS architecture is not intended to limit the principles and ideas of the inventions to such systems.

Also the detailed explanations given in the Technical Background section above are merely intended to better understand the mostly UMTS specific exemplary embodiments described in the following and should not be understood as limiting the invention to the described specific implementations of processes and functions in the mobile communication network.

As has been explained above, the current specified criteria for the unhappy status of a UE does not enable Node B to detect "DOWN" commands from a non-serving RLS in the non-RG based mode of operation. This in turn makes it impossible for the serving cell to take appropriate measures in order to handle or prevent further overload situations in a non-serving RLS.

One of the main ideas of the invention is therefore a new definition of the criteria for the unhappy status of a UE. According to this main idea, the mobile terminal may not indicate an "unhappy" condition as long as it is ramping up its resource utilization towards the maximum amount resources it is allowed to utilize for data transmissions on a dedicated uplink channel. The new definition of the unhappy status provided by the invention allows the Node B of the serving cell to detect "DOWN" commands from non-serving cells, if the mobile terminal is in soft handover.

Since the serving grant (SG) in a UE is only different to the maximum serving grant (MAX SG) while UE is in the ramping procedure, i.e. is increasing the utilized uplink resources towards maximum serving grant, according to one embodiment, the UE is always "happy" while ramping up resources. Thus, during the ramping procedure, the UE will not set the unhappy bit. After the ramping procedure has been finished the serving grant is equal to maximum serving grant.

In case the power and buffer status of the UE allows the transmission with a higher power ratio respectively E-TFC than allowed by maximum serving grant, the UE may indicate "unhappy" to serving cell. By this definition serving cell would be also able to detect a "DOWN" command from a non-serving RLS, which is shown in the following table.

| Case | PW headroom | PW limited by | Buffer status | Happy bit | E-TFC |
|------|-------------|---------------|---------------|-----------|-------|
| 1 | + | Ramping procedure SG < MAX SG | + | happy | LESS |
| 2 | + | Non-serving RLS MAX SG < AG (SG = MAX SG) | + | unhappy | LESS |

A possible definition of the unhappy criteria of a UE would be the following:

According to an embodiment of the invention, the UE thus indicates that it is "unhappy" with the current scheduling grants from the serving cell (and the non-serving cell(s) for the in a soft handover scenario), if all of the following criteria are met:
- UE has power available to send at higher data rates (E-TFCs)
- Total buffer status would require more than n TTIs with the current grants (where n is configurable)
- UE is transmitting with MAX SG (SG=MAX SG)

It is important to notice that while ramping, the UE will not set the happy bit to indicate an "unhappy" condition. In other words, the UE will not request the serving cell's Node B to increase resources for uplink transmissions via the dedicated uplink channel while it is increasing the utilized uplink resources towards the maximum serving grant.

Figure 12:
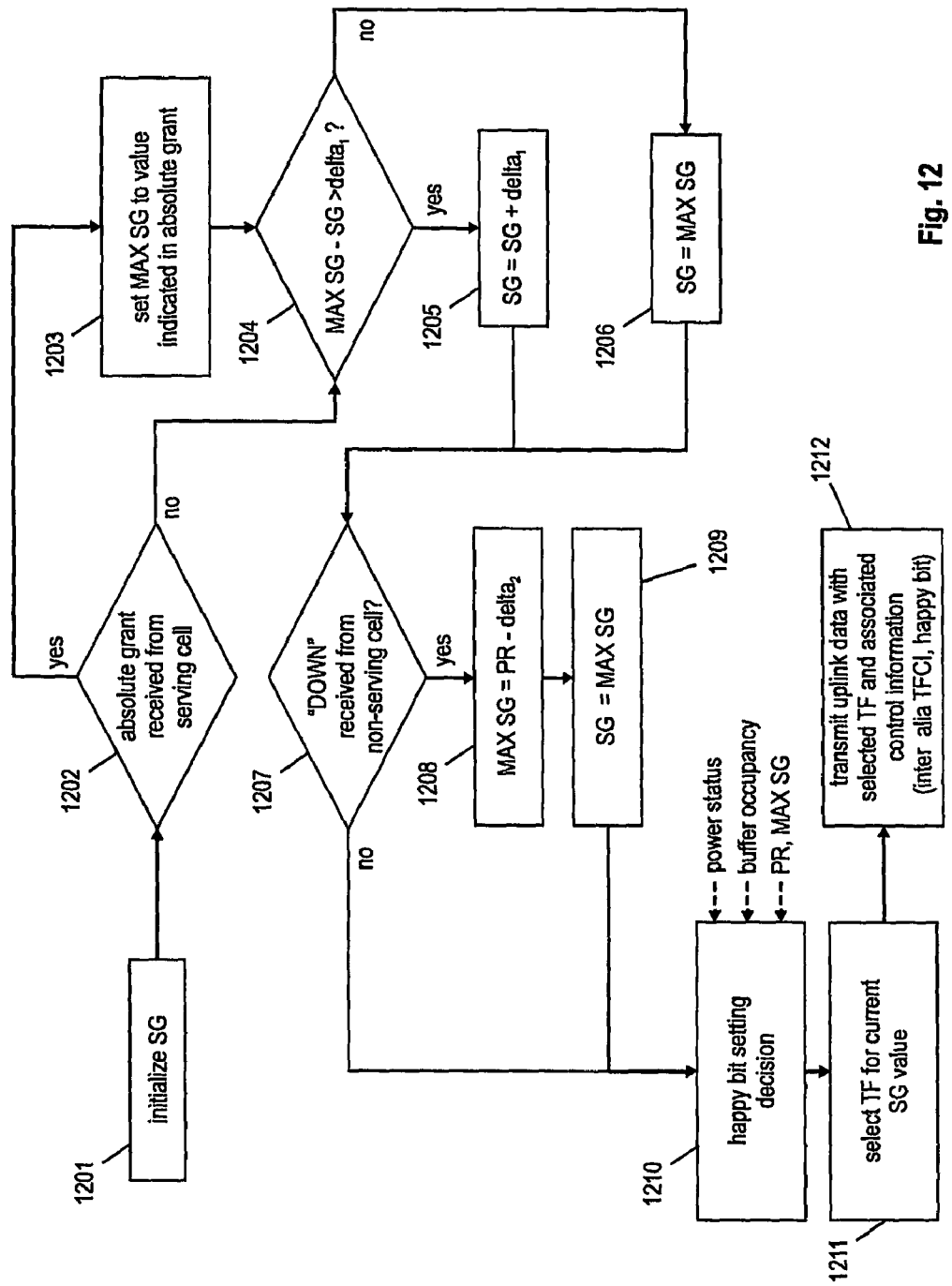
FIG. 12 shows a flow chart of the operation of a mobile terminal according to an exemplary embodiment of the invention.

In the following an embodiment of the invention will be explained with reference to FIG. 12 showing a flow chart illustrating the operation of a mobile terminal when communicating on a dedicated uplink channel, such as an E-DCH.

The mobile terminal maintains a state variable for every HARQ process, which indicates the amount of resources the mobile terminal is using for data transmissions on a dedicated uplink channel. Taking again an UMTS system as an example, the state variable may be used in the E-TFC selection algorithm as the maximum allowed E-DPDCH/DPCCH power ratio for the transmission of the HARQ process it refers to. This state variable may be referred to as a serving grant (SG).

The maximum serving grant (MAX SG) is another state variable for each HARQ process that denotes the maximum amount of uplink resources the mobile terminal may use for data transmissions on the uplink channel. Taking the example of transmissions via an UMTS E-DCH again, this state variable may define the maximum allowed E-DPDCH/DPCCH ratio.

According to this embodiment the maximum serving grant is controlled by the scheduling grants from serving cell. When the mobile terminal is in soft handover, i.e. is connected to a serving cell an at least one further non-serving cell, the maximum serving grant may be controlled by the serving cell and the non-serving cell.

Upon starting uplink data transmission, the mobile terminal initializes 1201 the serving grant value. As outlined previously, the current serving grant value indicates to the E-TFC selection entity, which power ratio can be used for the selection of an E-TFC for data transmission on the E-DCH when considering a UMTS system for exemplary purposes.

Further, the mobile terminal determines 1202 whether an absolute grant has been received through the serving cell, i.e. from the Node B of the serving cell responsible for scheduling the respective UE. According to this exemplary embodiment, the non-RG scheduling case is considered, i.e. the UE is only provided with absolute grants from the serving cell. These scheduling grants set the amount of resources the UE us allowed to utilize for the transmission of uplink data. When considering again the example of E-DCH transmissions, the absolute grants indicate the E-DPDCH/DPCCH power ratio.

In an alternative embodiment of the invention, the serving cell may use both, absolute grants and relative grants to specify the maximum serving grant, i.e. the maximum amount of resources the UE is allowed to utilize for uplink data transmissions on the uplink channel. In another alternative embodiment of the invention, the serving cell schedules all or a group of UEs in the cell, i.e. transmits common grants to the UEs.

If the mobile terminal has received an absolute grant, which has not yet been considered, the mobile terminal sets 1203 the maximum serving grant to the value indicated by the absolute grant from the serving cell.

Next, the mobile terminal determines 1204, whether the serving grant may be increased by the step size $delta_1$ without exceeding the maximum serving grant. If this is the case, the mobile terminal ramps up 1205 the current serving grant value, i.e. increases the serving grant value by a configurable step ($delta_1$):

$$SG = SG + delta_1.$$

Otherwise, the mobile terminal sets 1206 the serving grant value to the maximum serving grant value.

With respect to steps 1204, 1205 and 1206, it should be noted that in an alternative embodiments of the invention, the step size ($delta_1$) may vary from between successive increments of the serving grant value. For example, in the first iteration the serving grant may be increased by $delta_1$, in the second iteration by $2 \cdot delta_1$, etc. until the maximum serving grant value is reached. Another alternative may be to choose the step size $delta_1$ such that it equals the difference between the current maximum serving grant and the current serving grant value.

The step size $delta_1$ can be preconfigured or may be set by control signaling associated to the uplink transmissions on the dedicated uplink channel received through RRC signaling.

Next, the steps 1207, 1208 and 1209 are discussed. These steps are optional and may only be performed when the mobile terminal is in soft handover. In this situation, the mobile terminal determines 1207 whether a relative grant indicating a "DOWN" command has been received from a non-serving cell. As previously discussed a grant from a non-serving cell indicates to the mobile terminal to reduce its uplink resource utlization by a configurable amount.

If a relative grant has been received, the mobile terminal sets 1208 the maximum serving grant to the current last used power ratio (PR) value minus the configurable step-size (delta$_1$):

$$\text{MAX } SG = \text{last used power ratio} - \text{delta}_2$$

and sets 1209 the serving grant value to be used for E-TFC selection for data transmission in the next TTI to the new maximum serving grant value. In this embodiment, the power ratio may be considered as a measure of the uplink resources utilized for data transmission on the dedicated uplink channel.

According to another embodiment of the invention, the mobile terminal does not reset the maximum serving grant value to that indicated in the last absolute grant received, but keeps the maximum serving grant value until receiving a new absolute grant from the serving cell.

It should be noted that the step size delta$_2$ may be individually set by means of control signaling from the serving cell and/or non-serving cell(s) or may be preconfigured. Moreover, it is not necessary that delta, and delta$_2$ are of equal values.

In the exemplary embodiment of the invention illustrated in FIG. 12, the relative grants of the non-serving cell(s) dominate the absolute grants in that the relative grants "overwrite" the maximum serving grant value in case a absolute and a relative grant have been received. This operation may be advantageous, as this operation may allow for controlling the noise rise in the non-serving cell(s) during handover.

However, it may also be advantageous to allow the absolute grants dominating the relative grants, if both have been received before a next E-TFC selection process. For this situation, essentially, steps 1207, 1208 and 1209 would need to be performed prior to steps 1202 to 1206.

Either way, upon having updated the serving grant value and the maximum serving grant value—if necessary—the mobile terminal decides 1210 whether the happy bit (resource request flag) for requesting more uplink resources should be set. As explained previously, the mobile terminal is prohibited from setting the happy bit to indicate an "unhappy" condition, as long as the mobile terminal is ramping up resource utilization, i.e. the current serving grant is lower than the maximum serving grant and is (successively) increased as explained above. The mobile terminal may only indicate an "unhappy" condition, if the mobile terminal is currently using the maximum allowed resources for transmission of uplink data.

As indicated previously, the mobile terminal not being in soft handover may only indicate and "unhappy" condition by setting the happy bit:

if the power status of the mobile terminal allows for uplink data transmission via the dedicated uplink channel utilizing more uplink resources than the maximum uplink resources (MAX SG) set by the scheduling grant of the base station controlling the serving cell, and if the maximum uplink resources (MAX SG) set by the scheduling grant from the base station controlling the serving cell require more than a configurable number of transmission time intervals for transmitting buffered uplink data via the dedicated uplink channel, and if the mobile terminal is currently utilizing the maximum uplink resources (MAX SG=SG) set by the scheduling grant for uplink data transmission.

If the mobile terminal is in soft handover, these criteria may be redefined. In the soft handover case, the mobile terminal may set the resource request flag, i.e. indicate an "unhappy" condition if the power status of the mobile terminal allows for uplink data transmission via the dedicated uplink channel utilizing more uplink resources than the maximum uplink resources (MAX SG) set by scheduling grants from the serving cell and/or the non-serving cell, and if the maximum uplink resources (MAX SG) set by the scheduling grants require more than a configurable number of transmission time intervals for transmitting buffered uplink data via the dedicated uplink channel, and if the mobile terminal is currently utilizing the maximum uplink resources (MAX SG=SG) set by the scheduling grants for uplink data transmission.

Upon having decided whether to request more uplink resources by setting the happy bit, the mobile terminal next selects 1211 a transport format combination (TFC) for the current serving grant value. The E-TFC selection may for example be based on logical channel priorities like in the UMTS Release '99, i.e. the UE shall maximize the transmission of higher priority data.

Upon having selected the appropriate E-TFC for the transmission of the uplink data via the dedicated uplink channel, the data is transmitted 1212 along with control information associated thereto. The control information Inter alia comprise the happy bit (resource request flag) as well as a transport format combination indicator (TFCI) indicating the TFC used for transmitting the uplink data in the current TTI. Considering the example of an E-DCH uplink channel again, the uplink data are transmitted via and E-DPDCH (Enhanced Dedicated Physical Data CHannel). The control information is transmitted via the E-DPCCH (Enhanced Dedicated Physical Control CHannel) which is a physical channel used to transmit control information associated with the E-DCH.

In the soft handover case, the combination of the happy bit and the TFCI enables the Node B controlling the serving cell to recognize whether the mobile terminal has received a "DOWN" command from a non-serving cell. If the mobile terminal is ramping up its resource utilization for uplink transmissions, it is prohibited from setting the happy bit to indicate an "unhappy" condition. At the same time the TFCI will indicate a resource utilization lower than that granted by the serving cell. Hence, the Node B of the serving cells may derive from this combination of the TFCI and the happy bit that the mobile terminal is Increasing its resource utilization.

When receiving a "DOWN" command from a non-serving cell, the mobile terminal will set its resource utilization according to $$\text{new serving grant} = \text{new maximum serving grant} = \text{previous used power ratio} - \text{delta}_2$$

as explained previously. Given, that the buffer status requires and the power status allows for the utilization of more uplink resources, the mobile terminal will set the happy bit to indicate an "unhappy" condition. Again, the TFCI will indicate to the Node B controlling the serving cell that the resource utilization is below that granted by the Node B. Thus, the Node B may detect based on this combination that the mobile terminal has received a "DOWN" command from a non-serving cell.

Figure 13:
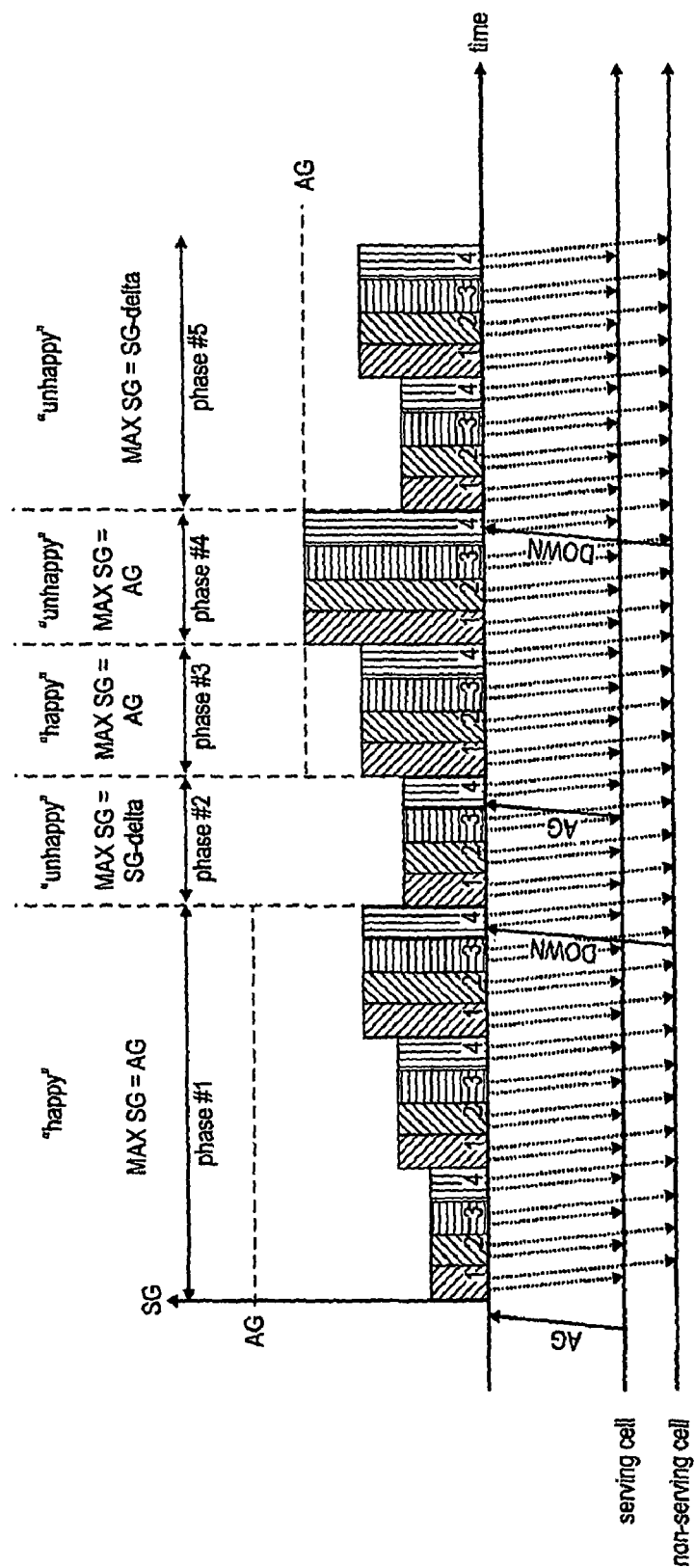
FIG. 13 shows a modified non-RG mode operation of a mobile terminal according to an exemplary embodiment of the Invention.

The happy bit setting according to an embodiment of the invention will be explained with reference to FIG. 13. FIG. 13 illustrates the relations between the current serving grant, the maximum serving grant and the happy bit status in accordance with an exemplary embodiment of the invention.

For the uplink communication of a mobile terminal in soft handover via two dedicated uplink channels the presence of four HARQ processes (shaded rectangles numbered 1 to 4) is assumed. At the beginning of the communication the terminal receives an absolute grant AG from the serving cell and sets the maximum serving grant accordingly. First, the mobile terminal ramps up its resource utilization by increasing the serving grant step-wise (phase #1). Accordingly the happy bit does not request for more uplink resources (happy condition).

Next, the mobile terminal receives a "DOWN" command from a non-serving cell. The maximum serving grant is set to the previous serving grant minus a configurable offset as described above, and the mobile terminal reduces its resource utilization to the new maximum serving grant set (phase #2). The mobile terminal sets the happy bit in the control information to indicate that it requires more resources to transmit uplink data. Further, the control information indicate that the resource utilization for the data transmissions in phase #2 is below the resources granted by the absolute grant from the serving cell.

The Node B controlling the serving cell detects based on the combination of the happy bit and the TFCI that the mobile terminal has received a "DOWN" command and reacts by sending a new absolute grant. In response to the reception of the new absolute grant, the mobile terminal starts ramping up resource utilization again and indicates a happy condition (phase #3). In phase #4, the serving grant is equal to the new maximum serving grant set by the last absolute grant from the serving cell. Assuming that all conditions outlined above are fulfilled, the mobile terminal indicates an unhappy condition. As the TCFI indicates resource utilization equal to the one set by the last absolute grant, the Node B controlling the serving cell may derive from the control information that the mobile terminal has finished the ramping and requests more resources for uplink transmissions.

Further, the mobile terminal receives another "DOWN" command from the non-serving cell. As in phase #2, the mobile terminal will thus reduce the resource utilization in phase #5 and indicates unhappy condition. The Node B controlling the serving cell may again detect the reception of a "DOWN" command from a non-serving cell based on the signaled control information, but does not decide to alter resource utilization granted previously.

The embodiments of the invention described above have been mainly related to the non-RG based scheduling mode. However the principles outlined above and in particular the definition of the criteria for setting the happy bit may be equally applied to the RG based scheduling mode.

Another embodiment of the invention relates to the implementation of the above described various embodiments using hardware and software. It is recognized that the various above mentioned methods as well as the various logical blocks, modules, circuits described above may be implemented or performed using computing devices (processors), as for example general purpose processors, digital signal processors (DSP), application specific integrated, circuits (ASIC), field programmable gate arrays (FPGA) or other programmable logic devices, etc. The various embodiments of the invention may also be performed or embodied by a combination of these devices.

Further, the various embodiments of the invention may also be implemented by means of software modules which are executed by a processor or directly in hardware. Also a combination of software modules and a hardware Implementation may be possible. The software modules may be stored on any kind of computer readable storage media, for example RAM, EPROM, EEPROM, flash memory, registers, hard disks, CD-ROM, DVD, etc.

The invention claimed is:

1. A method for communicating control information associated to uplink data on an Enhanced Dedicated Channel (E-DCH) of a Universal Mobile Telecommunication System (UMTS), wherein the method is performed by a user equipment (UE) and comprises:
    transmitting via an Enhanced Dedicated Physical Control Channel (E-DPCCH) control information associated to uplink data to a Node B controlling a serving cell, wherein the control information comprises a happy-bit that, when set, indicates to the Node B that the user equipment could use more than a maximum amount of uplink resources allowed by scheduling grants for transmitting scheduled uplink data via the E-DCH, and
    setting the happy-bit to request the Node B to increase the uplink resources for uplink data transmissions via the E-DCH if all of the following criteria are met:
    a) the UE has enough power available to transmit at a higher data rate,
    b) transmitting uplink data currently buffered for transmission via the E-DCH would require more than a configurable period of time when utilizing the resources set by the scheduling grants, and
    c) the user equipment is currently utilizing the maximum uplink resources set by scheduling grants for scheduled uplink data transmission.

2. The method according to claim 1, further comprising not setting the happy-bit if:
    a) the UE has not enough power available to transmit at a higher data rate, or
    b) the user equipment is not transmitting as much scheduled uplink data as allowed by the maximum uplink resources set by scheduling grants, or
    c) the user equipment transmits uplink data via the E-DCH without currently utilizing the maximum amount of uplink resources for scheduled uplink data as allowed by scheduling grants.

3. The method according to claim 1, further comprising the step of receiving a scheduling grant setting the maximum amount of uplink resources the user equipment is allowed to utilize for the transmission of scheduled uplink data via the E-DCH from the Node B controlling the serving cell.

4. The method according to claim 3, wherein a scheduling grant updates a serving grant indicating a maximum power ratio the user equipment is allowed to use for transmissions of scheduled uplink data on the E-DCH.

5. The method according to claim 4, wherein the maximum power ratio defines a power ratio of the E-DPDCH channel and a Dedicated Physical Control Channel (DPCCH) in the UMTS.

6. The method according to claim 4, wherein the maximum power ratio is used for selecting an appropriate transport format combination in a transport format selection procedure performed by the user equipment.

7. The method according to claim 1, further comprising:
    determining the occupancy of a buffer in the user equipment buffering data to be transmitted via the E-DCH;
    setting the happy-bit to request the Node B to increase the uplink resources for uplink data transmissions via the E-DCH, if all of the following criteria are met:
    a) the UE has enough power available to transmit at a higher data rate,
    b) the maximum uplink resources set by scheduling grants from the Node B controlling the serving cell require more than a configurable number of transmission time intervals for transmitting buffered uplink data via the E-DCH, and
    c) the user equipment is currently utilizing the maximum uplink resources set by scheduling grants for scheduled uplink data transmission.

8. The method according to claim 1, wherein the scheduling grant indicates the maximum uplink resources all user equipments controlled by the Node B of the serving cell transmitting data via an E-DCH respectively are allowed to utilize for scheduled uplink data transmissions via the E-DCHs within a transmission time interval.

9. The method according to claim 1, wherein the user equipment is in soft handover between the serving cell controlled by the Node B and a non-serving cell controlled by another Node B, and the method further comprises:
    transmitting the scheduled uplink data via another E-DCH to the other Node B controlling the non-serving cell, and
    setting the maximum uplink resources the user equipment is allowed to utilize for scheduled uplink data transmissions via both E-DCHs according to a scheduling grant received from the Node B controlling the serving cell.

10. The method according to claim 9, further comprising:
    receiving a relative scheduling grant from the Node B controlling the non-serving cell indicating to decrease the amount of uplink resources utilized by the user equipment,
    decreasing the amount of uplink resources utilized by the user equipment in response to the relative scheduling grant, and
    setting the maximum amount of uplink resources to a decreased amount of uplink resources for scheduled uplink data transmission in a next transmission time interval.

11. The method according to claim 10, wherein the control information transmitted via the E-DPCCH to the Node B controlling the serving cell further comprises a transport format indicator indicating a transport format combination used for transmitting scheduled uplink data to the Node B controlling the serving cell within a transmission time interval, wherein the transport format indicator indicates a transport format combination utilizing a lower amount of uplink resources than allowed by the Node B of the serving cell in the scheduling grant, and
    if the user equipment is transmitting scheduled uplink data via the E-DCH to the Node B controlling the serving cell utilizing the decreased amount of uplink resources, setting the happy-bit in the control information transmitted in the transmission time interval to the Node B controlling the serving cell,
    wherein the combination of the transport format indicator and the happy-bit in the control information indicates to the Node B controlling the serving cell that the maximum amount of uplink resources has been decreased based on a relative scheduling grant received from the Node B controlling the non-serving cell.

12. A user equipment (UE) for communicating control information associated to uplink data on an Enhanced Dedicated Channel (E-DCH) of a Universal Mobile Telecommunication System (UMTS), the user equipment comprising:
    a transmitter for transmitting via an Enhanced Dedicated Physical Control Channel (E-DPCCH) to a Node B control information associated to uplink data, wherein the control information comprises a happy-bit that, when set, indicates to the Node B controlling a serving cell that the user equipment could use more than a maximum amount of uplink resources allowed by scheduling grants for transmitting scheduled uplink data via the E-DCH, and
    wherein the transmitter sets the happy-bit to request the Node B to increase the uplink resources for uplink data transmissions via the E-DCH if all of the following criteria are met:
    a) the UE has enough power available to transmit at a higher data rate,
    b) transmitting uplink data currently buffered for transmission via the E-DCH would require more than a configurable period of time when utilizing the resources set by the scheduling grants, and
    c) the user equipment is currently utilizing the maximum uplink resources set by scheduling grants for scheduled uplink data transmission.

13. The user equipment according to claim 12, wherein the transmitter does not set the happy-bit if:
    a) the UE has not enough power available to transmit at a higher data rate, or
    b) the user equipment is not transmitting as much scheduled uplink data as allowed by the maximum uplink resources set by scheduling grants, or
    c) the user equipment transmits scheduled uplink data via the E-DCH without currently utilizing the maximum amount of uplink resources for scheduled uplink data.

14. The user equipment according to claim 12, further comprising:
    a receiver for receiving a scheduling grant setting the maximum amount of uplink resources the user equipment is allowed to utilize for the transmission of scheduled uplink data via the E-DCH from the Node B controlling the serving cell.

15. The user equipment according to claim 12, wherein a scheduling grant updates a serving grant indicating a maximum power ratio the user equipment is allowed to use for transmissions of scheduled uplink data on the E-DCH.

16. The user equipment according to claim 15, wherein the maximum power ratio defines a power ratio of the E-DPCCH channel and a Dedicated Physical Control Channel (DPCCH) in the UMTS.

17. The user equipment according to claim 15, wherein the maximum power ratio is used for selecting an appropriate transport format combination in a transport format selection procedure performed by the user equipment.

18. A computer readable medium storing instructions that, when executed by a processor of a user equipment (UE), cause the user equipment to communicate control information related to uplink data on an Enhanced Dedicated Channel (E-DCH) of a Universal Mobile Telecommunication System (UMTS), by:
    transmitting via an Enhanced Dedicated Physical Control Channel (E-DPCCH) control information associated to uplink data to a Node B controlling a serving cell, wherein the control information comprises a happy-bit that, when set, indicates to the Node B that the user equipment could use more than a maximum amount of uplink resources allowed by scheduling grants for transmitting scheduled uplink data via the E-DCH, and
    setting the happy-bit to request the Node B to increase the uplink resources for uplink data transmissions via the E-DCH if all of the following criteria are met:
    a) the UE has enough power available to transmit at a higher data rate,
    b) transmitting uplink data currently buffered for transmission via the E-DCH would require more than a configurable period of time when utilizing the resources set by the scheduling grants, and
    c) the user equipment is currently utilizing the maximum uplink resources set by scheduling grants for scheduled uplink data transmission.

* * * * *